(12) United States Patent
Jayaram et al.

(10) Patent No.: US 8,254,287 B2
(45) Date of Patent: Aug. 28, 2012

(54) METHODS AND APPARATUS FOR OPTIMAL PARTICIPATION OF DEVICES IN A PEER TO PEER OVERLAY NETWORK

(75) Inventors: Ranjith S. Jayaram, Bridgewater, NJ (US); Vidya Narayanan, San Diego, CA (US); Lakshminath R. Dondeti, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 389 days.

(21) Appl. No.: 12/485,586

(22) Filed: Jun. 16, 2009

(65) Prior Publication Data
US 2009/0310518 A1    Dec. 17, 2009

Related U.S. Application Data
(60) Provisional application No. 61/073,284, filed on Jun. 17, 2008.

(51) Int. Cl.
*H04L 12/28*    (2006.01)
(52) U.S. Cl. ...................................... 370/254
(58) Field of Classification Search .................. 370/254
See application file for complete search history.

(56) References Cited

U.S. PATENT DOCUMENTS

| | | | |
|---|---|---|---|
| 6,498,795 B1 * | 12/2002 | Zhang et al. | 370/400 |
| 7,782,867 B2 * | 8/2010 | Suzuki et al. | 370/395.31 |
| 2008/0183853 A1 * | 7/2008 | Manion et al. | 709/223 |
| 2009/0037445 A1 * | 2/2009 | Ushiyama | 707/100 |

FOREIGN PATENT DOCUMENTS
EP    1841141 A1    10/2007

OTHER PUBLICATIONS

Bryan, et al: "Concepts and Terminology for Peer to Peer SIP"; Cisco Systems; P2PSIP Working Group; Internet-Draft; Mar. 4, 2007.
Gupta, et al: "Efficient Routing for Peer-to-Peer Overlays"; MIT Computer Science and Artificial Intelligence Laboratory; csail.mit.edu.
Guha, et al: "NAT Behavioral Requirements for TCP draft-ietf-behave-tcp-7.txt"; Cisco Systems; Network Working Group; Internet-Draft; Oct. 30, 2007.
Cheshire, et al: "DNS-Based Service Discovery"; Apple Inc.; Internet-Draft; Sep. 10, 2008.

(Continued)

*Primary Examiner* — Ayaz Sheikh
*Assistant Examiner* — Blanche Wong
(74) *Attorney, Agent, or Firm* — Kristine U. Ekwueme

(57) ABSTRACT

Methods and apparatus for optimal participation of devices in a peer-to-peer overlay network. A method for dynamically configuring a node includes operating on an overlay network using a first participation mode, obtaining at least one configuration parameter, selecting a second participation mode for operation on the overlay network based on local policy and the at least one configuration parameter, and configuring the node to participate on the overlay network based on the second participation mode. An apparatus for dynamic node configuration includes a memory coupled to a processor and configured to operate on an overlay network using a first participation mode, obtain at least one configuration parameter, select a second participation mode for operation on the overlay network based on local policy and the at least one configuration parameter, and configure the node to participate on the overlay network based on the second participation mode.

20 Claims, 6 Drawing Sheets

OTHER PUBLICATIONS

Cheshire, et al: "Multicast DNS"; Apple Inc.; Internet-Draft, Sep. 10, 2008.

Rosenberg, J.; "Interactive Connectivity Establishment (ICE): A Protocol for Network Address Translator (NAT) Traversal for Offer/Answer Protocols"; Cisco Systems; Internet-Draft; Oct. 29, 2007.

Rosenberg, J.; "TCP Candidates with Interactive Connectivity Establishment (ICE)"; Cisco Systems; Internet-Draft; Feb. 25, 2008.

Rosenberg, J.: "NICE: Non Session Initiation Protocol (SIP) Usage of Interactive Connectivity Establishment (ICE)"; Cisco Systems; Internet-Draft; Feb. 15, 2008.

Rosenberg, et al: "Session Traversal Utilities for (NAT) (STUN)"; Cisco Systems; Internet-Draft; Feb. 23, 2008.

Rosenberg, et al: "Traversal Using Relays Around NAT (TURN): Relay Extensions to Session Traversal Utilities for NAT (STUN)"; Cisco Systems; Internet-Draft; Feb. 25, 2008.

Buford Avaya J. Labs Hybrid Overlay Multicast Framework, Feb. 25, 2008.

Ch L I Y Wang Bupt L: "Different types of nodes in P2PSIP; draft-li-p2psip-node-types-00-txt" IETF Standard-Working-Draft, Internet Engineering Task Force, IETF, Ch, Nov. 22, 2007, XP015054262 ISSN : 0000-0004 sections 2.1, 3, 4, 5, Nov. 22, 2007.

International Search Report and Written Opinion—PCT/US2009/047704, International Search Authority—European Patent Office—Dec. 4, 2009.

Osamu Segawa, "Web Annotation Sharing using P2P"; Proceedings of the 15th International Conference on World Wide Web—2006 Association for Computing Machinery US, ACM, 2 Penn Plaza, Suite 701, NY, US, pp. 851-852, section 2, figures 1,2. XP040040354, May 23-26, 2006.

* cited by examiner

METHODS AND APPARATUS FOR OPTIMAL PARTICIPATION OF DEVICES IN A PEER TO PEER OVERLAY NETWORK

CLAIM OF PRIORITY UNDER 35 U.S.C. §119

The present Application for Patent claims priority to Provisional Application No. 61/073,284 entitled "Methods and Apparatus for Optimal Participation of Devices in an Overlay Network" filed Jun. 17, 2008, and assigned to the assignee hereof and hereby expressly incorporated by reference herein.

BACKGROUND

1. Field

The present application relates generally to the operation of overlay networks, and more particularly, to methods and apparatus for optimal participation of devices in a peer-to-peer overlay network.

2. Background

A network in which member nodes obtain services in the absence of server-based infrastructure is referred to herein as a "peer-to-peer" overlay network. In a peer-to-peer overlay, peer nodes co-operate with each other both to provide services and to maintain the network. Peer-to-peer overlay networks can be built on top of an underlying network, such as a network utilizing the Internet Protocol (IP).

Typically, nodes in a peer-to-peer overlay network fully participate in routing and maintenance. While this is fine in an environment of homogeneous devices, a network of heterogeneous devices calls for different levels of device participation. For instance, there may be small and relatively lower power devices that want to participate on the overlay, but are unable to provide full routing and maintenance services. There are also situations in which it may be efficient, cost effective, and/or otherwise advantageous for devices with adequate resources to operate on the overlay network without participating in network routing and maintenance.

Therefore, it would be desirable to have an efficient mechanism by which nodes in a peer-to-peer overlay network can be dynamically configured to participate most efficiently in an overlay network.

SUMMARY

In one or more aspects, a node configuration system, comprising methods and apparatus, is provided that operates to dynamically configure nodes in a peer-to-peer overlay network to control network participation.

In an aspect, a method is provided that is performed by a node for dynamic node configuration in a peer-to-peer overlay network. The method comprises operating on the overlay network using a first participation mode, obtaining at least one configuration parameter, selecting a second participation mode for operation on the overlay network based on local policy and the at least one configuration parameter, and configuring the node to participate on the overlay network based on the second participation mode.

In an aspect, an apparatus is provided for dynamic node configuration in a peer-to-peer overlay network. The apparatus comprises means for operating on the overlay network using a first participation mode, means for obtaining at least one configuration parameter, means for selecting a second participation mode for operation on the overlay network based on local policy and the at least one configuration parameter, and means for configuring the node to participate on the overlay network based on the second participation mode.

In an aspect, an apparatus is provided for dynamic node configuration in a peer-to-peer overlay network. The apparatus comprises a memory and a processor coupled to the memory and configured to operate on the overlay network using a first participation mode, obtain at least one configuration parameter, select a second participation mode for operation on the overlay network based on local policy and the at least one configuration parameter, and configure the node to participate on the overlay network based on the second participation mode.

In an aspect, a computer program product is provided for dynamic node configuration in a peer-to-peer overlay network. The computer program product comprises a computer-readable medium embodying codes executable to operate on the overlay network using a first participation mode, obtain at least one configuration parameter, select a second participation mode for operation on the overlay network based on local policy and the at least one configuration parameter, and configure the node to participate on the overlay network based on the second participation mode.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes aspects of a node configuration system that operates to allow nodes in an overlay network to be dynamically configured to control network participation in a peer-to-peer overlay network.

Figure 1:
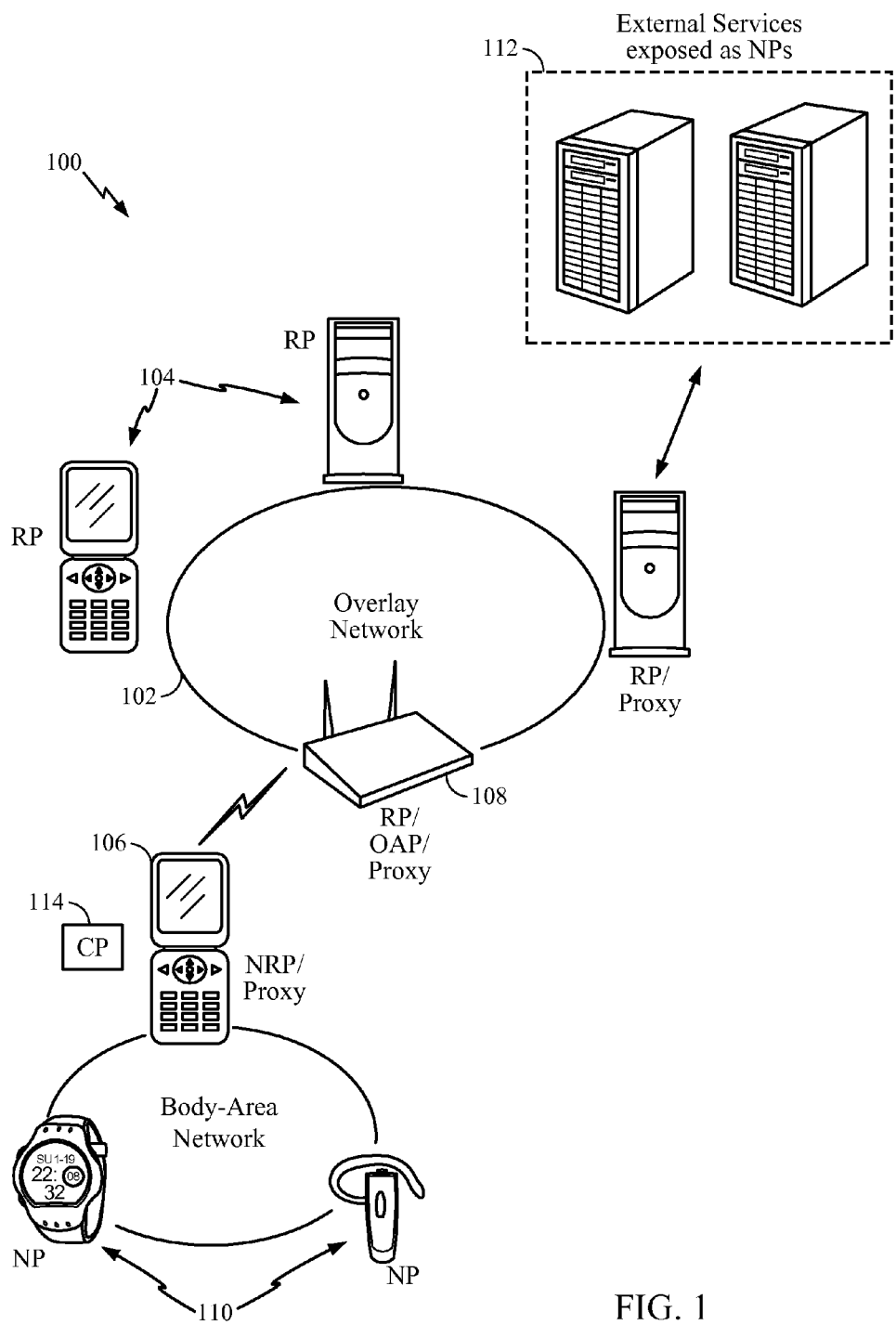
FIG. 1 shows an network that illustrates aspects of a node configuration system.

FIG. 1 shows a network 100 that illustrates aspects of a node configuration system. The network 100 comprises a peer-to-peer overlay network 102 which utilizes any type of underlying network, such as an Internet Protocol network, to allow nodes on the overlay network 102 to communication with each other. The underlying network may comprise any number or types of networks such as WANs, LANs, wireless networks or any other type of network.

In various implementations, the node configuration system operates to allow the nodes of the overlay network 102 to participate on the overlay network according to one of multiple modes of participation. For the purpose of this description, three modes of participation are described below; however, the system is not limited to just three modes and is suitable for operation with virtually any number of modes of participation.

In a first mode, full participation as a "Routing Peer" (RP) is defined. Referring to FIG. 1, nodes participating on the overlay network 102 as RPs are shown generally at 104. Nodes participating as RPs are full-fledged participants of the overlay network 102 and participate in routing and maintenance operations of the overlay network. They perform functions such as overlay maintenance, message routing and storage functionalities within the overlay network. Some RPs may be superior to others in terms of computing capacity and message processing speed; however, fundamentally all RPs are responsible for overlay routing, storage, and overlay maintenance and are considered to be operating as full participants.

In a second mode, partial participation as a "Non-routing peer" (NRP) is defined. Referring to FIG. 1, a node partially participating on the overlay network 102 as a NRP is shown at 106. Nodes participating as NRPs provide and receive services to/from an overlay network, but, do not participate in the routing and maintenance aspects of the overlay network. These nodes look identical to the RPs from a service point of view—they possess overlay node identifiers and are exposed to other nodes on the overlay network. However, NRPs maintain only a single connection to another peer on the overlay network. All of a NRP's overlay network requests route through that peer, which is also referred to as an Overlay Attachment Point (OAP) 108. NRPs participate in the overlay network, but do not actively participate in the routing or maintenance of the overlay network, thus they are considered to be operating as partial participants. They do not store overlay data but can store and retrieve data in the overlay network through their Overlay Attachment Point.

Non-Routing Peers operating on battery power benefit from being able to go idle because they do not maintain routing tables or need to respond with data for overlay storage requests. However, power consumption is required to maintain the single connection with the Overlay Attachment Point.

In a third mode, service participation as a Non-Peers (NP) is defined. Referring to FIG. 1, nodes participating on the overlay network 102 as NPs are shown generally at 110. NPs comprise devices or services that cannot or do not want full or partial participation on the overlay network. For example, constrained devices may want to use overlay network services or in some cases may even want to provide services to entities in the overlay network, but cannot support the full or partial participation functions of a RP or NRP. These devices provide service participation on the overlay network as NPs by communicating with an Overlay Proxy Server (OPS) running on a RP or NRP. For example, the NPs 110 participate in the overlay network 102 through an OPS running at the NRP 106. It should also be noted that NPs are not necessarily constrained devices. Some NP devices may have substantial memory and/or processing resources but still function as NPs on the overlay network. For example, the NPs 112 may provide significant storage and processing resources that are available as services to nodes on the overlay network 102.

In various aspects, devices such as personal computers, network access points, and high-end mobile phones, that do not have significant constraints on their resources, are examples of RPs. Devices such as low-end mobile phones and battery-powered wireless sensors, that have significant constraints on their resources, are examples of NRPs. Devices that do not support the overlay protocol, such as watches or headsets, are examples of NPs.

A NP entity may utilize any means of connecting to its associated OPS. The RP or NRP proxy all overlay requests associated with the NP. Thus, NPs always attach to the overlay network via a Proxy device. Nodes participating as NPs do not have identities on the overlay and are, by definition, not members of the overlay. Any services provided by NPs are modeled as services provided by the corresponding proxy on the overlay network. In some examples, a NP using an unspecified communication protocol with a proxy RP or NRP may be used to further reduce the battery consumption needed for interfacing with the overlay network.

The proxy node appears to other nodes on the overlay network as the entity that generates or satisfies overlay requests to a proxied NP. In some examples, popular services performed by NPs may have more than one proxy for better availability. Thus, the proxy node operates as a transit and translator for all traffic between the overlay network and NP node it proxies.

In various aspects, the node configuration system operates to allow a node to be dynamically configured to participate on the overlay network in any of the three modes of participation described above. For example, the node 106 comprises a configuration processor (CP) 114 that operates to allow node 106 to be configured and dynamically control its mode of participation. For example, the CP 114 allows the node 106 to dynamically select from full participation (i.e., RP), partial participation (i.e., NRP), and service participation (i.e., NP). Having the capability to be dynamically configured to participate in any of the available modes of participation allows a node to operate more efficiently, flexibly and conserve power and/or resources.

For example, the CP 114 operates to allow the node 106 to be configured for partial participation as a NRP and offer proxy services to NPs 110. In another aspect, the node 106 may be configured for service participation as a NP that is proxied by RP 108. In still another aspect, the node 106 may be configured for full participation on the overlay network 102 as a RP. A more detailed description of the operation of the CP 114 is provided below.

Figure 2:
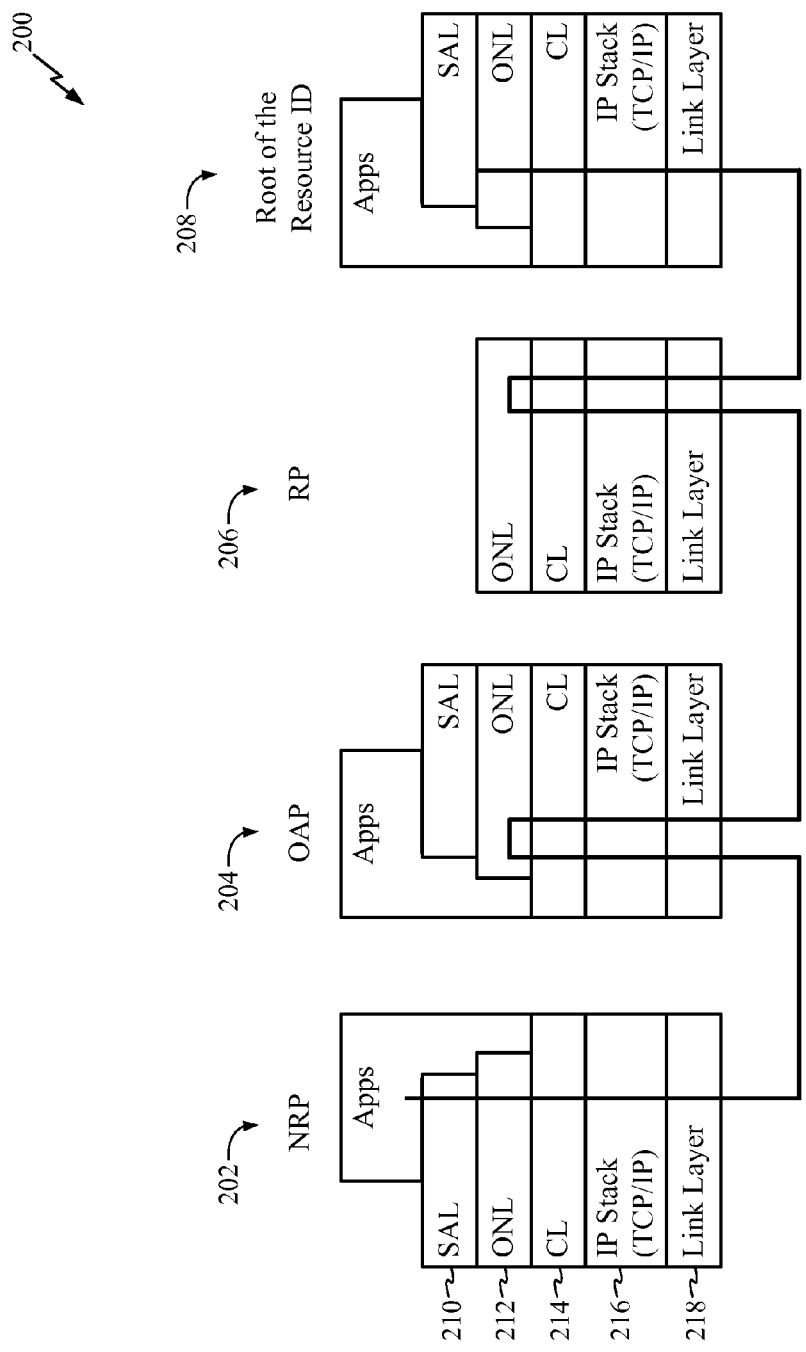
FIG. 2 illustrates exemplary protocol stacks for implementing the various modes of network participation in accordance with a node configuration system.

FIG. 2 illustrates exemplary protocol stacks 200 for implementing the various modes of node participation in accordance with a node configuration system. The protocol stacks 200 comprise a NRP protocol stack 202, an OAP protocol stack 204, an RP protocol stack 206, and a resource protocol stack 208. For example, the NRP protocol stack 202 is provided by the CP 114.

The NRP protocol stack 202 is functionally similar to the OAP protocol stack 204. They both implement a Service Adaptation Layer (SAL) 210, Overlay Network Layer (ONL) 212, and Connectivity Layer (CL) 214, IP stack layer 216, and link layer 218. Within the ONL 212, the functionality corresponding to routing and forwarding is absent within the NRP protocol stack 202. The NRP has one route to the Overlay Attachment Point (OAP). Within the CL 214 of the NRP protocol stack 202, the neighbor maintenance overhead is reduced to maintaining connectivity management with only the OAP. The NRP is also expected to send a ping packet (to keep the connection alive) to the OAP.

The CP 114 operates to configure the service adaptation layer 210 for making a mode determination and indicates the mode of participation of the node in a call to the overlay network layer 212 to join a specific overlay. The join process of an NRP is similar to the join process of a RP. The OAP is the admitting peer (the node that owns the identity of the joining entity at the time of join). In a variation, the OAP be any one of the RPs in the overlay, not necessarily the admitting peer. In the case where the OAP is not the admitting peer, forwarding state may be required in the admitting peer for message routing to the NRP. Alternately, source routing may be used to deliver messages to the NRP. A NRP may have multiple OAPs for load balancing, temporary failover capability, etc. In this case, source routing may be used to deliver messages to the NRP.

RPs are expected to serve as OAPs to allow NRPs to join the overlay. OAPs differentiate between other joining peers and joining NRPs. During the join process, in case of NRPs, the OAPs finish the join process after establishing a neighbor relationship with the NRP. There is no communication to other entities (specifically neighbors of the OAP) within the overlay about the presence of a NRP. The OAP stores all resource identifiers that the NRP owns according to the overlay implementations. From the point of view of the rest of the overlay, the identity space is owned by the OAP and therefore all messages to the identity space arrive at the OAP. Examples of such messages include requests to store data in an overlay (PUT requests), requests to retrieve data from an overlay (GET requests), and requests to test connectivity with a node in an overlay (PING requests). The OAP satisfies all such messages associated with the identity space assigned to a NRP.

Figure 3:
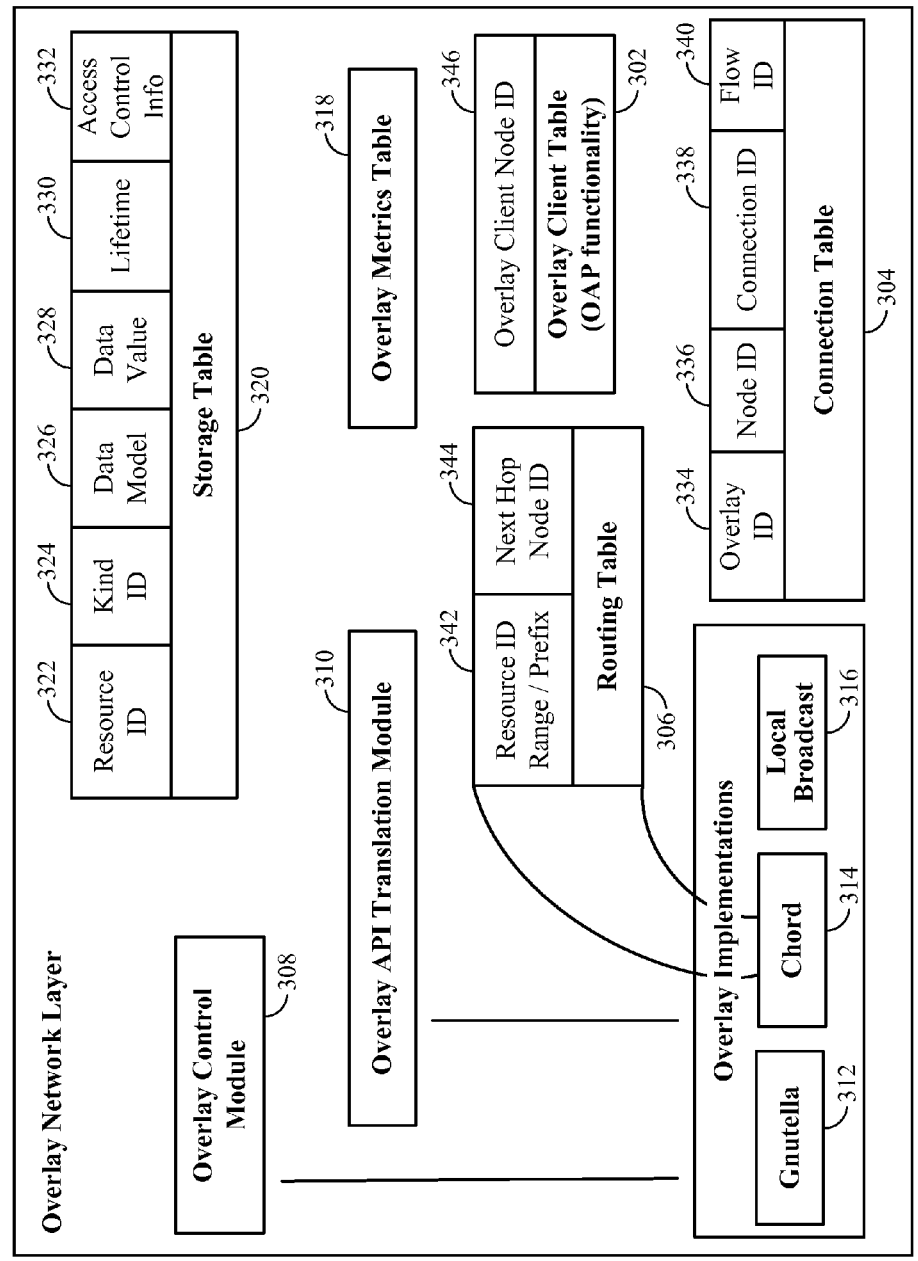
FIG. 3 shows exemplary modules of an overlay network layer for use in aspects of a node configuration system.

FIG. 3 shows exemplary modules of an overlay network layer 300 for use in aspects of a node configuration system. For example, the ONL 300 is suitable for use as the ONL 212 of the NRP 202 and the OAP 204 shown in FIG. 2. The OAP 204 maintains an Overlay Client table 302, where it keeps track of all identities for which it serves as an NRP, which includes overlay client node identifier 346. Corresponding to an entry in the Overlay Client table 302, the OAP 204 will maintain a connection to that NRP in its Connection Table 304. The Connection Table 304 comprises overlay identifier 334, node identifier 336, connection identifier 338, and flow identifier 340.

The NRP indicates to the OAP that it is joining the overlay as a NRP and at that time the admitting peer (AP) records the NRP's node identifier in the Overlay Client Table 302. When the root of the Non-Routing Peer's node identifier changes (due to a new node joining as a successor or predecessor to the AP), the OAP also changes. To facilitate the transfer of the NRP to OAP association, the current OAP sends an update message corresponding to each NRP whose OAP changed due to the new OAP indicating the type of the node.

In the case where the overlay network layer 300 is part of the NRP 202, the Overlay Client Table 302 is absent. In this case, the Routing Table 306 will have a single entry for all routes to be pointing to the OAP as the next hop. For example, the Routing Table 306 comprises a resource identifier range prefix 342 and a next hop node identifier 344. The Connection Table 304 will indicate a connection to the OAP as well.

FIG. 3 also shows the following aspects of the system. The Overlay Control Module 308 contains the intelligence required to form and maintain an overlay. The Overlay API Translation Module 310 translates requests from an application into requests to specific overlay implementations. Examples of such specific overlay implementations include peer-to-peer overlays such as Gnutella 312 and Chord 314. In place of an overlay, the application's requests can also be transmitted using a Local Broadcast medium 316. The Overlay Metrics Table 318 contains performance, routing, and other metrics related to an overlay. Finally, the Storage Table 320 is an example of how data can be stored on overlay nodes. An item of data is associated with a Resource identifier 322 that is chosen from the overlay's identifier space; a Kind identifier 324 that indicates the category of data; a Data Model 326 that specifies the type of data; the Data 328 itself; a Lifetime 330 parameter that indicates the duration of the data's validity; and Access Control Information 332 that denotes the permissions that different overlay nodes and users have in order to access and modify the data.

Transition Between Participation Modes

In various implementations, the CP 114 allows each node to determine for itself its mode of participation on the overlay network as a RP, NRP or NP. The determination is based on local policy and one or more configuration parameters that comprise, but are not limited to, link characteristics, energy budgeting within the node, the load on the node, expected communication overhead, power, processing, storage resources, user input, network configuration, and/or other local or network policies. The mode of participation may also be based on the type of device itself.

For example, a node operating as a NRP can be dynamically configured as a RP. For a NRP to achieve full participation as a full RP, the OAP and the NRP continue the join process. Messages, usually called UPDATEs, are sent to the NRP's new neighbors informing them of the NRP's presence. The NRP also takes ownership of all the data associated with the identity space it now owns. This is accomplished by transferring such data from the old owner of the data to the NRP. In another aspect, a node may dynamically change its participation by leaving the overlay network while in its current participation mode and rejoining the overlay network in a new participation mode that has been determined by the CP 114 based on one or more of the configuration parameters identified above.

Figure 4:
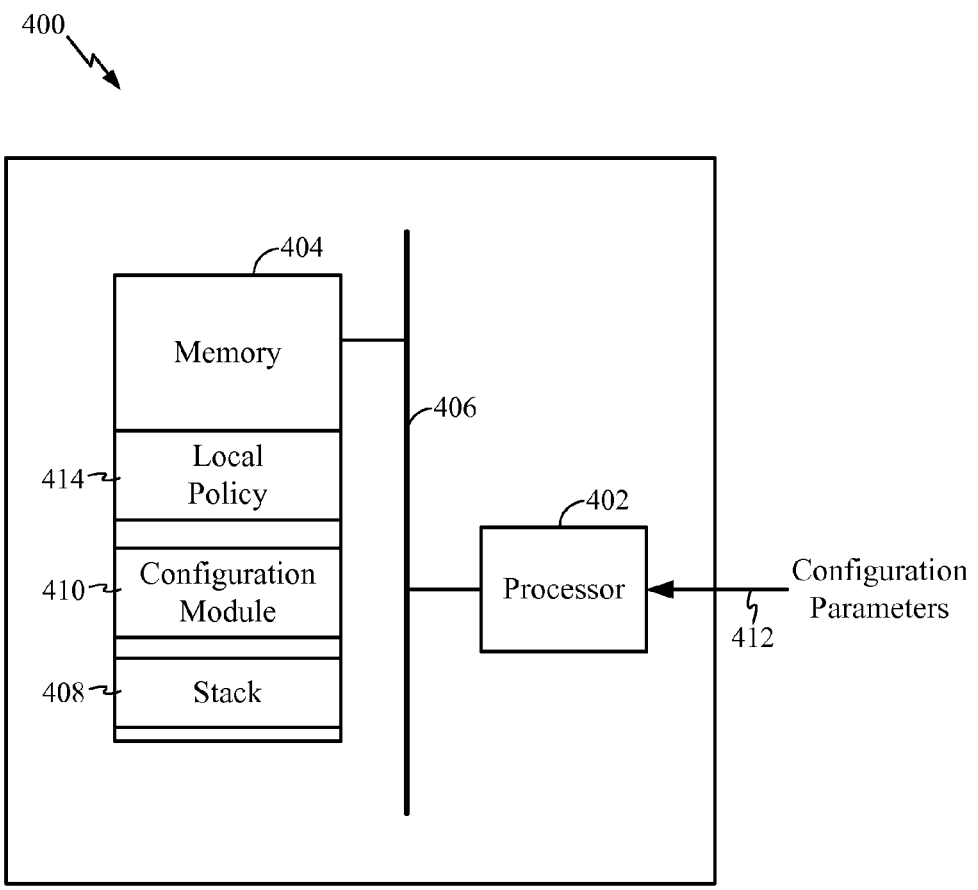
FIG. 4 shows an exemplary configuration processor for use in aspects of a node configuration system.

FIG. 4 shows an exemplary configuration processor 400 for use at a node in aspects of a node configuration system. For example, the configuration processor 400 is suitable for use as the configuration processor 114 shown in FIG. 1. The configuration processor 400 comprises processor 402 and memory 404 coupled to a data bus 406. It should be noted that the configuration processor 400 is just one implementation and that other implementations are possible within the scope of the aspects.

The memory 404 comprises any suitable storage device operable to store information associated with one or more nodes of a peer-to-peer overlay network. For example, the memory 404 is operable to store a protocol stack 408, such as the protocol stack 202 shown in FIG. 2. The memory 404 is also operable to store local policy 414, which provides operating policies at the node. The memory 404 is also operable to store configuration module 410 comprising programs, instructions, codes and/or any other type of executable information that are executable by the processor 402 to provide the functions of the node configuration system described herein.

In one or more aspects, the processor 402 comprises at least one of a CPU, processor, gate array, hardware logic, ASIC, memory elements, and/or hardware executing software. In an aspect, the processor 402 operates to execute the instructions of the configuration module 410 to obtain configuration parameters 412 and perform various operations with respect to the local policy 414 and the protocol stack 408 to allow a node to determine is participation mode in an overlay network. In an aspect, the configuration parameters are obtained by the processor 402 by evaluating the node's current resources/capabilities and by receiving parameters associated with the overlay network. For example, the following configuration parameters are obtained by the processor 402.

1. Device power resource parameters
2. Device processing resource parameters
3. Device storage resource parameters
4. Network configuration parameters
5. User input It should be noted that the above list is exemplary and that other configuration parameters may be obtained by the processor 402 to determine the node's participation mode. A more detailed description of the operation of the configuration processor 400 is provided below.

In an aspect, the node configuration system comprises a computer program product having one or more program instructions ("instructions") or sets of "codes" stored or embodied on a machine-readable medium. When the codes are executed by at least one processor, for instance, the processor 402, their execution causes the configuration processor 400 to provide the functions of the node configuration system described herein. For example, the machine-readable medium comprises a floppy disk, CDROM, memory card, FLASH memory device, RAM, ROM, or any other type of memory device or machine-readable medium that interfaces to the configuration processor 400. In another aspect, the sets of codes may be downloaded into the configuration processor 400 from an external device or communication network resource and stored in the memory 404. The sets of codes, when executed, operate to provide aspects of a node configuration system as described herein.

Figure 5:
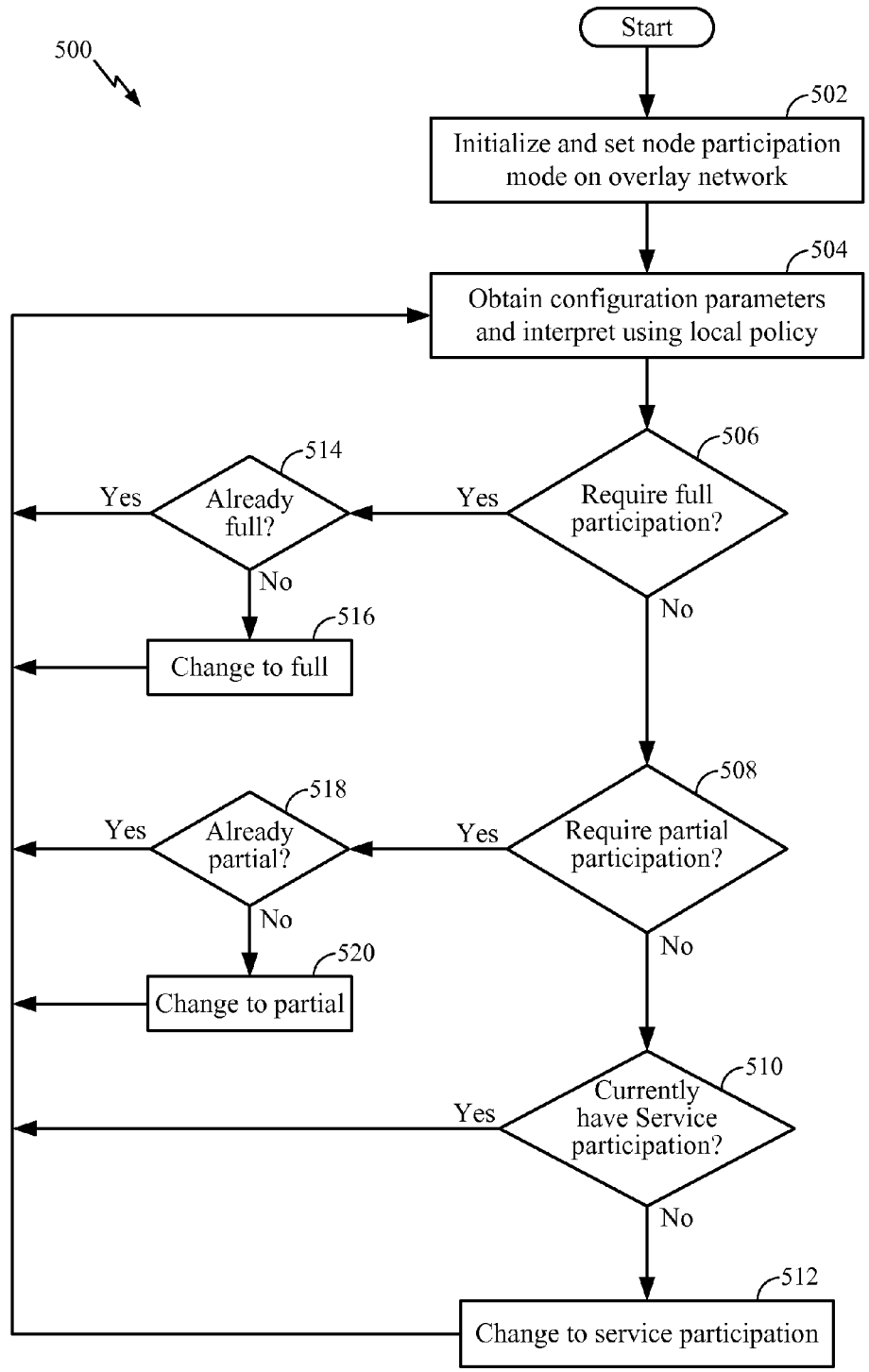
FIG. 5 shows an exemplary method for operating a node to provide aspects of a node configuration system.

FIG. 5 shows an exemplary method 500 for operating a node to provide aspects of a node configuration system. For clarity, the method 500 is described below with reference to the configuration processor 400 shown in FIG. 4. For example, the configuration processor 400 may operate at a node in a peer-to-peer overlay network. In an aspect, the processor 402 executes one or more sets of codes or instructions provided by the configuration module 410 to control the configuration processor 400 to perform the functions described below.

At block 502, a participation mode for a node on an overlay network is set. In an aspect, the processor 402 operates to control the protocol stack 408 to set the participation mode. For example, the node may be configured for full participation, partial participation, or service participation.

At block 504, configuration parameters are obtained and interpreted in accordance with local policy. In an aspect, the processor 402 obtains the configuration parameters from one or more entities operating at the node. The configuration parameters comprise but are not limited to device power, processing and storage parameters, network configuration parameters and user input. In an aspect, the configuration parameters are interpreted by the processor 402 using the local policy 414.

At block 506, a determination is made as to whether the node requires full participation on the overlay network. In an aspect, the processor 402 makes this determination from the configuration parameters. For example, if the configuration parameters indicate power and resources are available for full participation, then the method proceeds to block 514. If full participation is not possible, the method proceeds to block 508.

At block 508, a determination is made as to whether the node requires partial participation on the overlay network. In an aspect, the processor 402 makes this determination from the configuration parameters. For example, if the configuration parameters indicate power and resources are available for partial participation, then the method proceeds to block 518. If partial participation is not possible, the method proceeds to block 510.

At block 510, a determination is made as to whether the node is configured for service participation on the overlay network. In an aspect, the processor 402 makes this determination from the configuration parameters. If the node is already configured for service participation, the method proceeds to block 504. If the node is not configured for service participation, the method proceeds to block 512.

At block 514, a determination is made as to whether the node is already configured for full participation on the overlay network. In an aspect, the processor 402 makes this determination. If the node is already configured for full participation, the method proceeds to block 504. If the node is not configured for full participation, the method proceeds to block 516.

At block 516, the node is configured for full participation. For example, to have full participation on the overlay network, the node is configured as a routing peer. In an aspect, the processor 402 performs this operation. For example, in one implementation, the node leaves the overlay network in its current participation mode and rejoins the overlay network in full participation mode as a routing peer. The method then proceeds to block 504.

At block 518, a determination is made as to whether the node is already configured for partial participation on the overlay network. In an aspect, the processor 402 makes this determination. If the node is already configured for partial participation, the method proceeds to block 504. If the node is not configured for partial participation, the method proceeds to block 520.

At block 520, the node is configured for partial participation. For example, the node is configured as a non-routing peer in the overlay network. In an aspect, the processor 402 performs this operation. For example, in one implementation, the node leaves the overlay network in its current participation mode and rejoins the overlay network in partial participation mode as a non-routing peer. The method then proceeds to block 504.

At block 512, the node is configured for service participation. For example, the node is configured as a non peer in the overlay network. In an aspect, the processor 402 performs this operation. For example, in one implementation, the node leaves the overlay network in its current participation mode and rejoins the overlay network in service participation mode as a non peer. The method then proceeds to block 504.

Therefore, the method 500 is operable at a node to provide aspects of a node configuration system. It should be noted that the method 500 is just one implementation and that the operations of the method 500 may be rearranged or otherwise modified within the scope of the various aspects. Thus, other implementations are possible with the scope of the various aspects described herein.

Figure 6:
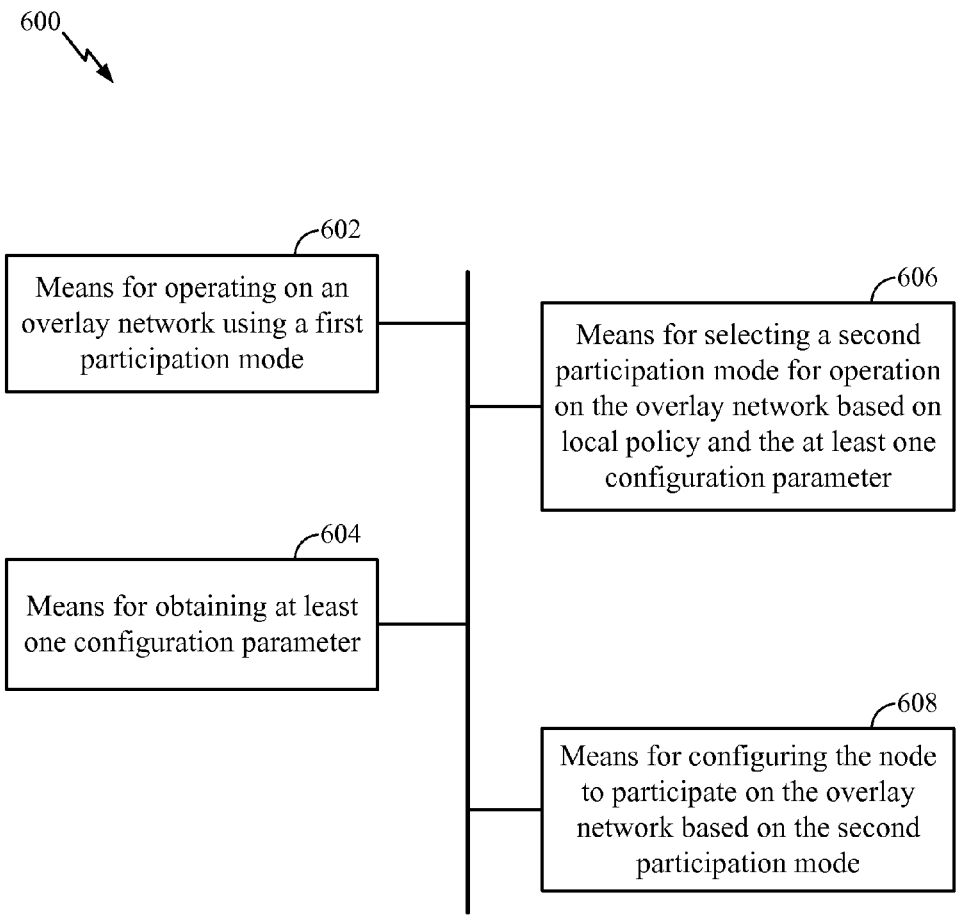
FIG. 6 shows an exemplary configuration processor for use in aspects of a node configuration system.

FIG. 6 shows an exemplary configuration processor 600 for use in aspects of a node configuration system. For example, the configuration processor 600 is suitable for use as the configuration processor 400 shown in FIG. 4. In an aspect, the configuration processor 600 is implemented by at least one integrated circuit comprising one or more modules configured to provide aspects of a node configuration system as described herein. For example, in an aspect, each module comprises hardware and/or hardware executing software.

The configuration processor 600 comprises a first module comprising means (602) for operating on an overlay network using a first participation mode, which in an aspect comprises the processor 402. The configuration processor 600 also comprises a second module comprising means (604) for obtaining at least one configuration parameter, which in an aspect comprises the processor 402. The configuration processor 600 also comprises a third module comprising means (606) for selecting a second participation mode for operation on the overlay network based on local policy and the at least one configuration parameter, which in an aspect comprises the processor 402. The configuration processor 600 also comprises a fourth module comprising means (608) for configuring the node to participate on the overlay network based on the second participation mode, which in an aspect comprises the processor 402.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Accordingly, while aspects of a node configuration system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method performed by a node for dynamic node configuration in a peer-to-peer overlay network, the method comprising:
    operating on the overlay network using a first participation mode;
    obtaining at least one configuration parameter;
    selecting a second participation mode for operation on the overlay network based on local policy and the at least one configuration parameter; and
    configuring the node to participate on the overlay network based on the second participation mode;
    wherein the selecting comprises selecting the second participation mode from a plurality of participation modes available on the overlay network; and
    wherein the plurality of participation modes comprise a full participation mode, a partial participation mode and a service participation mode.

2. The method of claim 1, wherein the at least one configuration parameter is at least one of a power indicator, memory indicator, resource indicator, network indicator, and a user indicator.

3. The method of claim 1, wherein the full participation mode corresponds to operation as a routing peer.

4. The method of claim 1, wherein the partial participation mode corresponds to operation as a non-routing peer.

5. The method of claim 1, wherein the service participation mode corresponds to operation as a non peer.

6. An apparatus for dynamic node configuration in a peer-to-peer overlay network, the apparatus comprising:
    means for operating on the overlay network using a first participation mode;
    means for obtaining at least one configuration parameter;
    means for selecting a second participation mode for operation on the overlay network based on local policy and the at least one configuration parameter; and
    means for configuring the node to participate on the overlay network based on the second participation mode;
    wherein the means for selecting comprises means for selecting the second participation mode from a plurality of participation modes available on the overlay network; and
    wherein the plurality of participation modes comprise a full participation mode, a partial participation mode and a service participation mode.

7. The apparatus of claim 6, wherein the at least one configuration parameter is at least one of a power indicator, memory indicator, resource indicator, network indicator, and a user indicator.

8. The apparatus of claim 6, wherein the full participation mode corresponds to operation as a routing peer.

9. The apparatus of claim 6, wherein the partial participation mode corresponds to operation as a non-routing peer.

10. The apparatus of claim 6, wherein the service participation mode corresponds to operation as a non peer.

11. An apparatus for dynamic node configuration in a peer-to-peer overlay network, the apparatus comprising:
    a memory; and
    a processor coupled to the memory and configured to:
        operate on the overlay network using a first participation mode;
        obtain at least one configuration parameter;

select a second participation mode for operation on the overlay network based on local policy and the at least one configuration parameter; and configure the node to participate on the overlay network based on the second participation mode;

wherein the processor is configured to select the second participation mode from a plurality of participation modes available on the overlay network; and wherein the plurality of participation modes comprise a full participation mode, a partial participation mode and a service participation mode.

12. The apparatus of claim 11, wherein the at least one configuration parameter is at least one of a power indicator, memory indicator, resource indicator, network indicator, and a user indicator.

13. The apparatus of claim 11, wherein the full participation mode corresponds to operation as a routing peer.

14. The apparatus of claim 11, wherein the partial participation mode corresponds to operation as a non-routing peer.

15. The apparatus of claim 11, wherein the service participation mode corresponds to operation as a non peer.

16. A computer program product for dynamic node configuration in a peer-to-peer overlay network, the computer program product comprising:

a non-transitory computer-readable medium embodying codes executable to:

operate on the overlay network using a first participation mode;

obtain at least one configuration parameter;

select a second participation mode for operation on the overlay network based on local policy and the at least one configuration parameter;

configure the node to participate on the overlay network based on the second participation mode;

wherein the codes are configured to select the second participation mode from a plurality of participation modes available on the overlay network; and wherein the plurality of participation modes comprise a full participation mode, a partial participation mode and a service participation mode.

17. The computer-readable medium of claim 16, wherein the at least one configuration parameter is at least one of a power indicator, memory indicator, resource indicator, network indicator, and a user indicator.

18. The computer-readable medium of claim 16, wherein the full participation mode corresponds to operation as a routing peer.

19. The computer-readable medium of claim 16, wherein the partial participation mode corresponds to operation as a non-routing peer.

20. The computer-readable medium of claim 16, wherein the service participation mode corresponds to operation as a non peer.

* * * * *